United States Patent [19]

Collora et al.

[11] Patent Number: 4,527,783
[45] Date of Patent: Jul. 9, 1985

[54] UNIVERSAL CONTOURED PARTS HOLDING FIXTURE

[75] Inventors: George A. Collora, Holbrook; Ronald C. Braun, West Islip, both of N.Y.

[73] Assignee: Grumman Aerospace Corporation, Bethpage, N.Y.

[21] Appl. No.: 488,818

[22] Filed: Apr. 26, 1983

[51] Int. Cl.³ .............................................. B25B 11/00
[52] U.S. Cl. ................................... 269/21; 269/266; 269/297; 269/303; 294/64.1
[58] Field of Search .............. 269/21, 71, 266, 289 R, 269/296, 297, 298–301, 303, 315; 294/64 R, 65

[56] References Cited

U.S. PATENT DOCUMENTS

| | | | |
|---|---|---|---|
| 1,110,409 | 9/1914 | Sutherland, Jr. | 294/65 |
| 1,346,185 | 7/1920 | Eggers | 269/299 |
| 2,623,773 | 12/1952 | Melzer | 294/64.1 |
| 2,729,040 | 1/1956 | Wallace et al. | 269/21 |
| 2,986,075 | 5/1961 | Ranney | 269/310 |
| 3,530,994 | 9/1970 | Bourassa et al. | 269/266 |
| 3,559,980 | 2/1971 | Terai et al. | 269/20 |
| 3,658,286 | 4/1972 | Terai et al. | 269/309 |
| 3,729,810 | 5/1973 | Piechocki | 269/310 |
| 3,804,319 | 4/1974 | Piechocki | 269/310 |
| 3,942,778 | 3/1976 | Fadiga et al. | 269/26 |
| 4,066,039 | 1/1978 | Fletcher et al. | 269/21 |
| 4,088,312 | 5/1978 | Frosch et al. | 269/21 |
| 4,200,272 | 4/1980 | Godding | 269/26 |
| 4,278,348 | 7/1981 | Funk et al. | 269/310 |

Primary Examiner—Frederick R. Schmidt
Assistant Examiner—Judy J. Hartman
Attorney, Agent, or Firm—Morgan, Finnegan, Pine, Foley & Lee

[57] ABSTRACT

A universal apparatus for holding contoured work-pieces in a selected pre-determined contour during the performance of various manufacturing operations is disclosed. The apparatus comprises a spring metal frame supported by a base, which through the activation of computer programmable linear actuator members can be deformed to a desired pre-determined contour to form a contoured support plane for a work-piece. The spring metal frame portion of the apparatus further comprises a device for indexing the contoured work-piece in the contoured support plane formed by the deformed spring metal frame. The spring metal frame is also provided with a constraining device which comprises a plurality of spaced vacuum cups which are selectively activated to secure the work-piece to the metal frame.

12 Claims, 12 Drawing Figures

UNIVERSAL CONTOURED PARTS HOLDING FIXTURE

BACKGROUND OF THE INVENTION

The present invention is directed to a universal apparatus, for holding contoured work-pieces, without the use of individual holding fixtures or templates, while manufacturing operations are being performed on the work-piece. It is directed, more particularly, to a universal apparatus for holding contoured work-pieces in any desired pre-determined contour during the performance of various manufacturing operations, the contour being controlled by a programmable computer.

Devices for holding work-pieces during the performance of manufacturing operations are well known in the prior art. In U.S. Pat. No. 2,729,040 issued Jan. 3, 1956 to Wallace et al., there is disclosed a work-holding plate which can be adjusted to conform to the surface contour of a particular work-piece. The work-holding plate comprises a flexible steel plate with an adjustment mechanism located adjacent to the bottom side of the plate for adjusting the plate's curvature. The work-holding plate is also provided with vacuum chucks for securing the work-piece adjacent to the plate's upper surface.

The adjustment mechanism of the prior art work holder comprises manually operated jack screws which engage the underside of the work-holding plate. Although the device can be contoured to the pre-determined curvature of a work-piece, there is a danger that a work-piece may be deformed from its pre-determined contour as there is no means provided to precisely and repeatedly position similarly contoured work-pieces to the work-holding plate. Moreover, since the work-holding plate is mounted on a base by end attachment means such a device does not allow for a wide range of contour deformation.

This prior art holding mechanism has a number of other disadvantages as well. For example, the use of a flexible spring steel plate does not allow for a wide range of contour deformation. In addition, the use of a screw jack adjusting mechanism which merely engages the underside of the work-holding plate does not have the ability to pull as well as push and thus cannot generate various concave and convex contours.

Another type of prior art holding mechanism that has been proposed is directed to a tape controlled multiple jig arrangement for supporting a built-up surface formed by a series of individual plates. This prior art holding mechanism uses a plurality of spaced, rodlike jigs carried by a support surface. The jigs are adapted for supporting several metal blocks which are built-up in a desired position prior to the welding of the blocks together. A pressurized fluid operated motor and a valve means are associated with each jig for selectively adjusting the height of the jig with respect to the support surface. This holding device is also provided with a control device for feeding control signals to the individual jigs and a perforated tape which carries control signal information for controlling the heights of the individual jigs carried by the support surface.

Although this holding mechanism utilizes a plurality of programmable jigs it has the significant disadvantage of only being able to support a work-piece. For this reason, this holding mechanism is unable to rigidly secure a work-piece and thus would impart undesirable movement to the work-piece during the performance of manufacturing operations. Moreover, the jigs which are used to support the work-piece do not have the ability to pull as well as push and therefore cannot generate various concave and convex contours.

The present invention provides a universal work-piece holding apparatus which overcomes the disadvantages of the prior art devices by providing a lattice type spring metal framework composed of a plurality of vertical flexible supporting bands each interconnected with a plurality of flexible horizontal connecting bands, the spring metal frame being characterized in that it can form a firm contoured support plane over a large area using very few actuator members; it can consequently provide a much greater range of contour deformation. The use of flexible supporting bands each interconnected with a plurality of flexible connecting bands allows for a reduction in the number of programmable actuator members needed for forming a contoured support plane, since each actuator member will cause the deflection of adjoining supporting bands through the action of the connecting bands. This arrangement therefore allows the spring metal frame to form a firm contoured support plane over a large area.

The holding apparatus is also provided with fixed and adjustable index points which precisely orient a work-piece to the position data of numerical or computer controlled equipment performing manufacturing tasks on the work-piece, thereby allowing the user of the apparatus to repeatedly place similarly contoured work-pieces in the same work position without the possibility of inadvertently deforming a work-piece having a different contour.

Accordingly, it is a principle object of the present invention to provide a universal apparatus for holding contoured work-pieces in a pre-determined contour during the performance of various manufacturing operations.

Another object of the present invention is to provide a computer controlled apparatus having the capability to support and precisely orient a contoured work-piece relative to the position data of numerical or computer controlled equipment performing manufacturing tasks on the work-piece.

A further object of the present invention is to provide an apparatus that has a spring metal frame which can form a contoured support plane which corresponds to the pre-determined contour of a particular work-piece.

A still further object of the present invention is to provide an apparatus for holding a contoured work-piece using the combination of a plurality of flexible supporting bands each interconnected with a plurality of flexible connecting bands so that only a limited number of linear actuator members are needed for deforming the spring metal frame to the pre-determined contour of the work-piece.

Still another object of the present invention is to provide an apparatus for holding a contoured work-piece which utilizes a limited number of linear actuator members for forming concave and convex contours.

Another object of the present invention is to provide an apparatus for holding a contoured work-piece which includes means for indexing the contoured work-piece in the contoured support plane of the spring metal frame so as to provide precise and repeatable work-piece positioning.

It is also an object of the present invention to provide an apparatus for holding a contoured work-piece which utilizes a plurality of spaced vacuum cups which can be selectively activated for holding a specific work-piece in the contoured support plane formed by the spring metal frame.

Other objects and various further features of novelty will be pointed out and will occur to those skilled in the art in the following specification when taken in conjunction with the accompanying drawings.

SUMMARY OF THE INVENTION

The present invention is directed to an apparatus for holding a contoured work-piece in a pre-determined contour while manufacturing operations are being performed on the work-piece. The apparatus comprises a spring metal frame, supported along its horizontal center line by a base, which through the activation of computer controlled linear actuator members can be deformed to a pre-determined contour to form a contoured support plane for a work-piece. The spring metal frame portion of the apparatus further comprises means for indexing the contoured work-piece in the contoured support plane formed by the deformed spring metal frame. The indexing means includes a fixed and an adjustable index point which provide precise and repeatable work-piece positioning in the contoured support plane. The spring metal frame is also provided with constraining means which comprises a plurality of spaced vacuum cups which are selectively activated to secure the work-piece to the metal frame.

BRIEF DESCRIPTION OF THE DRAWINGS

For a fuller understanding of the invention, reference is had to the following description taken in connection with the accompanying drawings of the preferred embodiment in which.

DESCRIPTION OF THE PREFERRED EMBODIMENT

Figure 1:
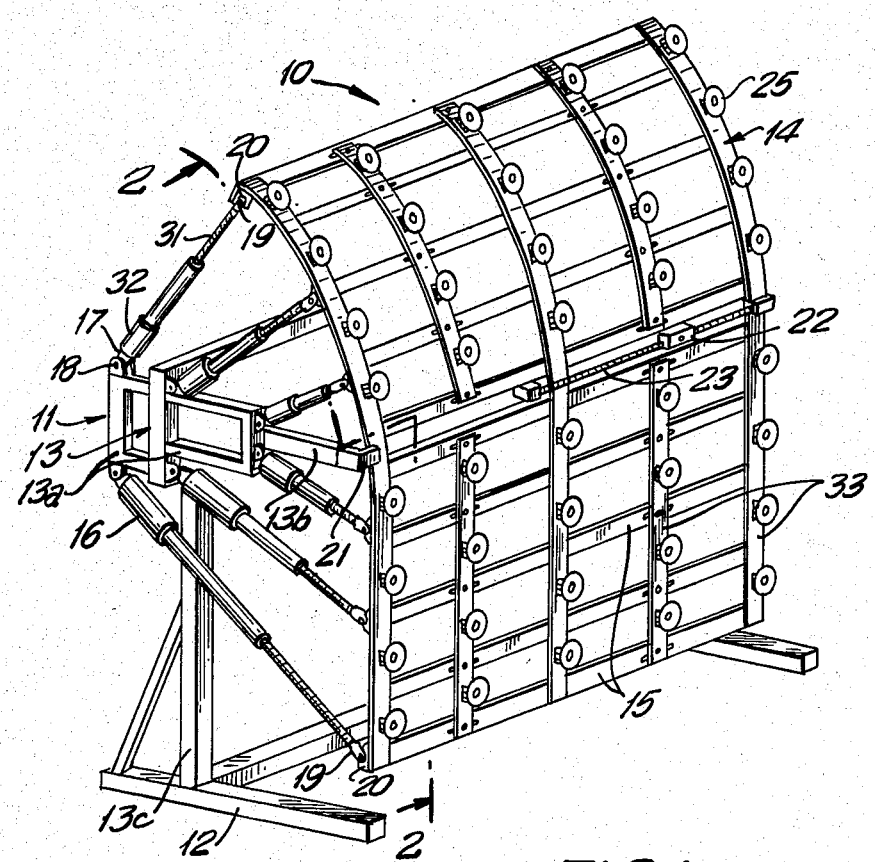
FIG. 1 is a perspective view of the holding apparatus of the present invention as it appears prior to the activation of the linear actuator members.

Referring now more particularly to the accompanying drawings, wherein like numerals designate similar parts throughout the various views, attention is directed first to FIG. 1, wherein exemplary apparatus embodying the present invention is designated generally by reference number 10. More specifically, apparatus 10 comprises a base 11 which consists of a generally "H" shaped platform 12 upon which is mounted an essentially inverted "L" shaped support member 13.

The base portion of the inverted "L" is comprised of a substantially rectangular member 13a and an axially extending arm 13b attached at one end to one side of rectangular member 13a. The other end of arm 13b is attached to the horizontal center line of spring metal frame assembly 14. The vertical portion 13c of inverted "L" shaped support member 13 is attached at one end to platform 12 and at the other end to a second side of rectangular member 13a so as to support member 13a and arm 13b in a substantially horizontal orientation. Spring metal frame 14 generally comprises a rectangular lattice framework of flexible supporting bands 33 each interconnected with a plurality of flexible connecting bands 15. It should be understood, however, that the spring metal frame of the present invention is not limited to any particular size or shape. Rather, the physical dimension or contour of the spring metal frame is varied in accordance with the pre-determined contour of the work-piece with which it is to be used. It should also be noted that although the spring metal frame is discussed hereinafter in terms of consisting of strip spring steel, it should be understood that the spring metal frame of the present invention may be constructed of a variety of materials.

The illustrated embodiment also includes linear actuator members 16 which consist of lead screw assembly 31 and reversible drive motor 32. Linear actuator members 16 are positioned on base 11 to displace flexible bands 15 and 33 for deforming spring metal frame 14 to a pre-determined contour. More specifically, linear actuator members 16 are positioned at spaced points on base 11 and are positively connected thereto. The end 17 of each linear actuator member 16 is attached to base 11 by a bracket 18.

The opposite end of each actuator member 16 is provided with a bracket member 19 which is fixedly attached to the underside of the spring metal frame 14 with a bracket member 20. Bracket members 20 are vertically aligned in a spaced series on spring metal frame 14 such that bracket members 20 may be fixedly attached to bracket members 19 of linear actuator members 16 so as to secure linear actuator members 16 to spring metal frame 14. Thus, when linear actuator members 16 are activated this will cause the deflection of the adjoining supporting bands 33 through the action of connecting bands 15. The ability of linear actuator members 16 to pull and push flexible bands 15 and 33 allows for a wide range of concave and convex contours.

Referring again to FIG. 1, it can be seen that spring metal frame 14 is also provided with index points 21 and 22. Index point 21 comprises a fixed locating pin which engages a corresponding index point provided on the surface of a specifically contoured work-piece. Index point 22 comprises an adjustable locating pin which is slidably mounted along the central axis of reference rod 23. Reference rod 23 is attached to the outside surface of spring metal frame 14 along its horizontal center line. Adjustable index point 22 moves along reference rod 23 manually. Thus adjustable index point 22 of spring metal frame 14 and fixed index point 21 located opposite adjustable index point 22 function to precisely and repeatedly orient specifically contoured work-pieces to the contoured support plane formed by spring metal frame 14.

Figure 3:
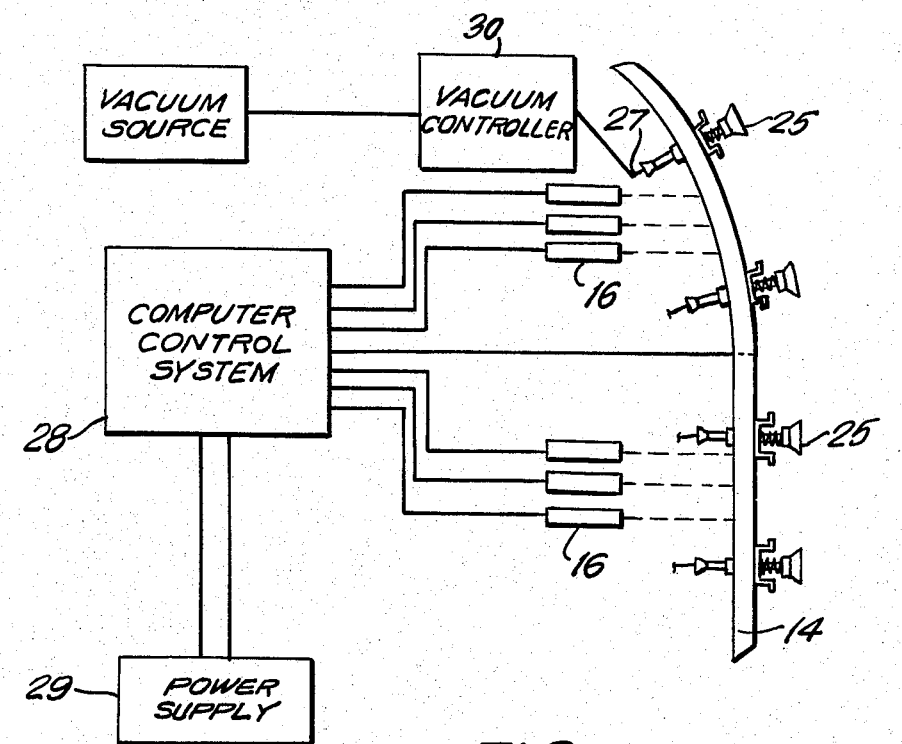
FIG. 3 is a schematic diagram of the holding apparatus of the present invention.
Figure 2:
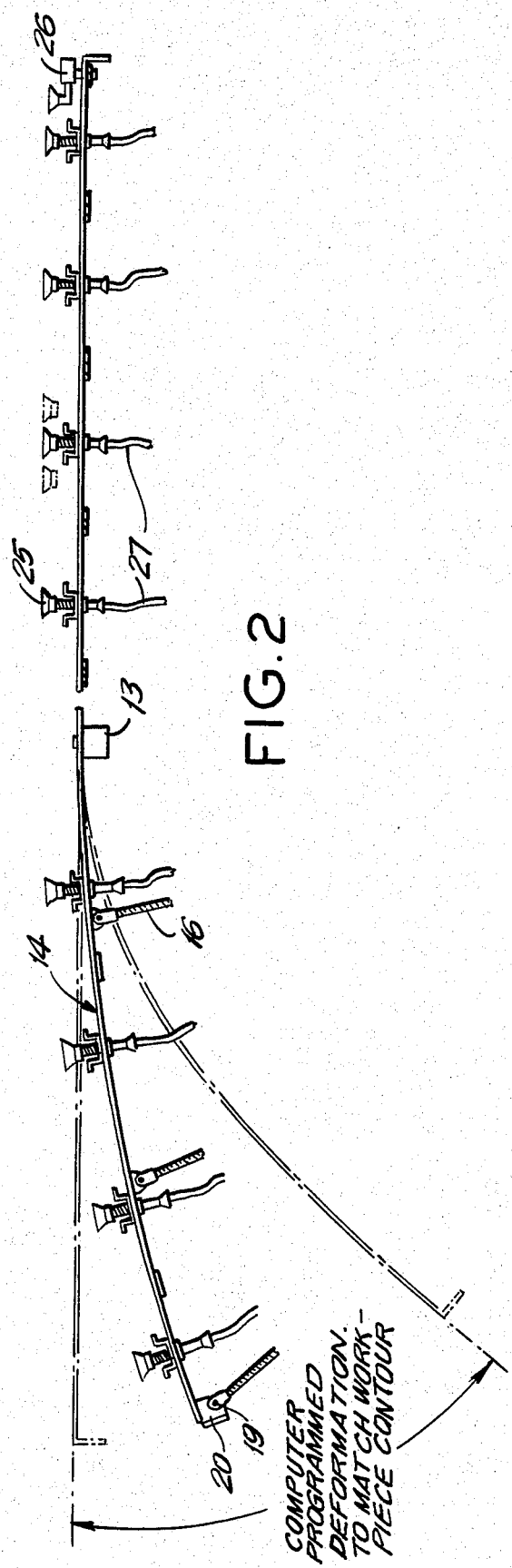
FIG. 2 is an enlarged side elevational view of the spring metal frame of the present invention depicting a range of contour deformation.
Figure 2A:
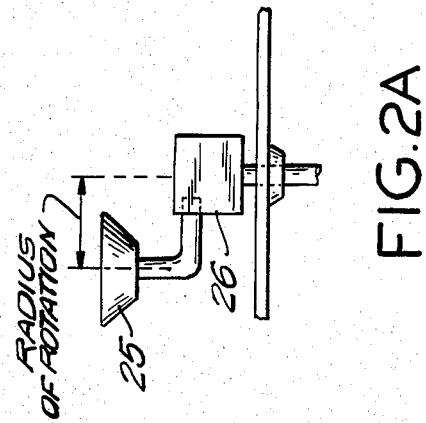
FIG. 2A is an enlarged side elevational view of the constraining device of the present invention.

Referring now to FIGS. 1 and 2A, spring metal frame 14 is provided with constraining means on its flexible supporting bands 33 for holding contoured work-pieces in the support plane. The constraining means comprises swivel mounted vacuum cups 25 which are arranged in a spaced series lengthwise on each flexible support band 33. As can be better seen in FIG. 2A, each vacuum cup 25 is provided at its lower end with a swivel adjustment means 26 so as to enable vacuum cup 25 to be positioned in the contoured support plane formed by spring metal frame 14 without interfering with the manufacturing operations being performed on the work-piece. As can be seen in FIG. 3, each vacuum cup 25 is attached to a vacuum supply line 27 which is selectively operated by vacuum manifold 30 in a previously determined pattern. Thus, vacuum cups 25, which are made of rubber or a like material, can be selectively activated and positioned so as to secure a specifically contoured work-piece to the contoured spring metal frame without interfering with the manufacturing tasks that are being performed on the work-piece.

FIG. 3 shows the holding apparatus of the present invention with computer control system 28 which activates linear actuator members 16 for contouring the support plane of spring metal frame 14 to the pre-determined contour of a particular work-piece. The computer control system utilized in the present invention performs the task of selectively activating the inward-outward movement of each of the linear actuator members 16. The computer utilized in the present invention is of the normal, commercially available type.

Figure 4:
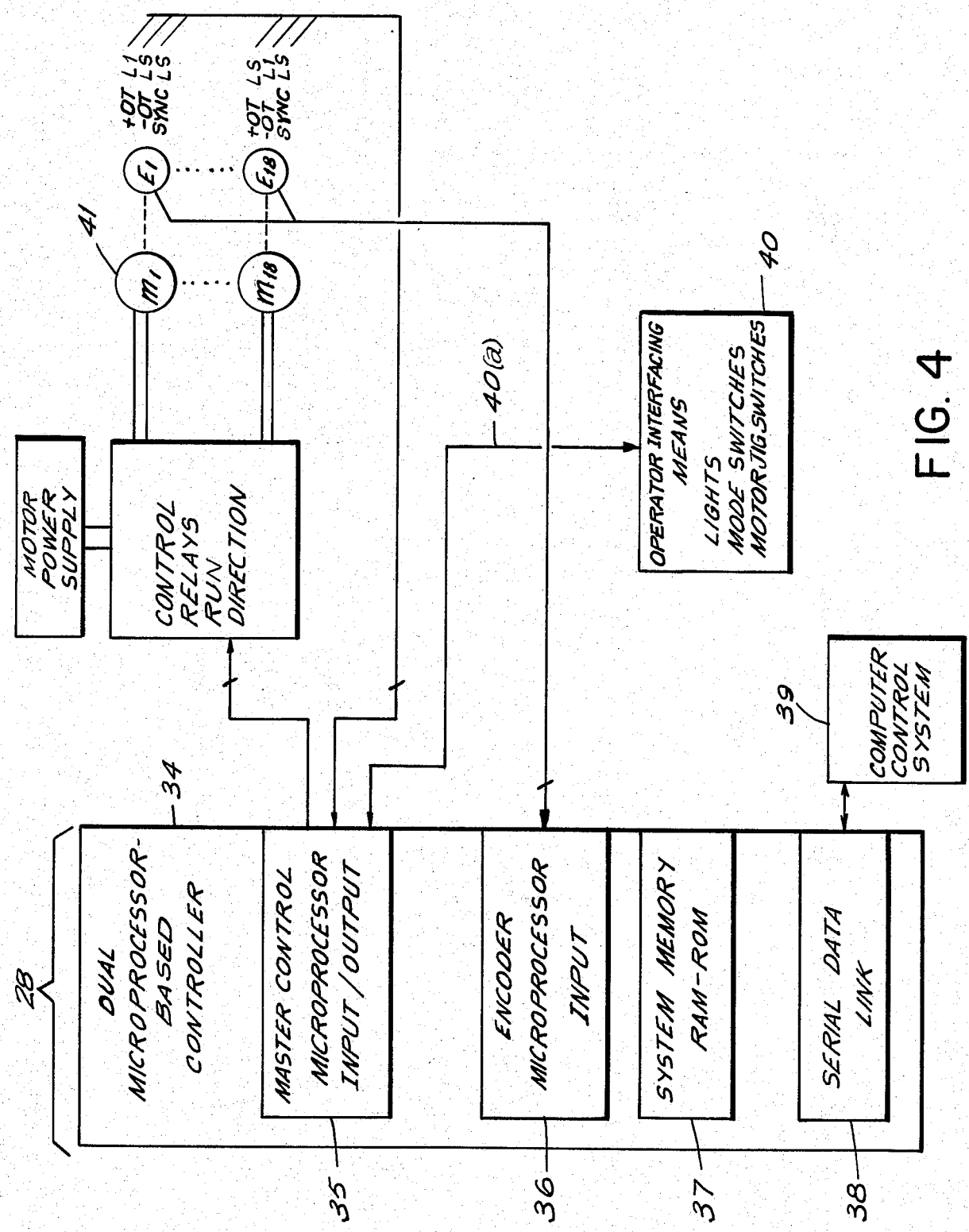
FIG. 4 is an overall block diagram of the computer control system of the present invention.

An overall diagram of the control system of the present invention is shown in FIG. 4. The heart of the control system is microprocessor-based controller 34. Control system 28 comprises controller 34 which consists of two single-board microprocessors 35 and 36, which operate in a parallel processing environment. These microprocessors include a master control microprocessor 35 and an encoder microprocessor 36. Each microprocessor 35 and 36 has access to a system memory 37 and a serial data link 38 which is connected to a suitable computer control system 39. In the preferred embodiment standard singleboard microcomputers manufactured by Intel Corporation (SBC Models 80/24 and 86/05) are used. However, as would be understood by one skilled in the art, any equivalent computer or hard-wired circuits may also be used.

Microprocessor-based controller 34 utilizes a hardware bus archectiture based upon Intel Corporation's multi-bus processor organization. The two microprocessors 35 and 36, the system memory 37, the serial data link 38 and certain peripheral devices, such as operator interfacing means 40, communicate with each other over this system bus.

A typical memory system for use in the present invention consists of a read-only memory (ROM) to hold the program of instructions and a random access memory (RAM) to hold results and variable data for use in microprocessor units 35 and 36.

The illustrative control system 28 also includes operator interfacing means 40 embodied as a typical control panel having function switches for initiating, through master control microprocessor 35, the various functions associated with precisely positioning linear actuator members 16. The control panel communicates with control system 28, and specifically with microprocessor 35 through an appropriate data link 40a.

In the present invention, control panel 40 is preferably provided with a plurality of control switches which are used to impart movement to linear actuator members 16. Each control switch communicates with a particular linear actuator member 16 through master control microprocessor 35 in such a way that an operator, using a particular control switch in conjunction with a direction switch, can request master control microprocessor 35 to extend or retract a desired actuator member 16. In some applications, control panel 40 is used to extend or retract a plurality of actuator members 16 simultaneously and is also provided with speed selection switches which cooperate with master control microprocessor 35 to control the rate responses of actuator members 16.

The master control microprocessor 35 which receives the control panel 40 inputs, performs the tasks of overall control of the system including motor control, monitoring for over-travel, synchronizing, switch sensing and interfacing to computer control system 39 via serial data link 38.

In the preferred embodiment of the present invention, the operator will instruct master control microprocessor 35 via commands entered at control panel 40 to record the positions of all actuator members 16, once these actuator members are positioned to form the desired pre-determined contour. This initial positioning information is then transmitted to the computer control system 39 via serial data link 38, for storage, e.g., on a disk.

The operator can also display various status indications of control system 28 on the control panel by activating appropriate thumbwheel switches and corresponding control switches. The information displayed will consist minimally of the present actuator positions, and the recorded positions of the actuators if such positions have been stored.

Figure 5:
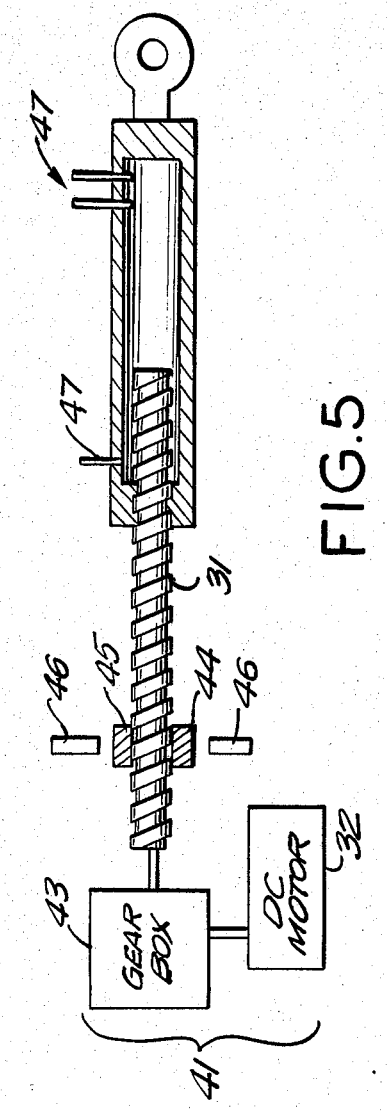
FIG. 5 is a schematic diagram of a computer controlled linear actuator member of the present invention.

The output section of control system 28 consists of linear actuator members 16 which are activated by drive means 41. As shown in FIG. 5, drive means 41 comprises standard, commercially available reversible drive motor 32 and a gear box 43. Various standard, commercially available relays are used to control drive motor 32. Linear actuator members 16 further include integral collar 44 mounted on lead screw assembly 31.

Actuators 16 include shaft-to-digital encoders for feedback of position data. As can be seen in FIG. 5, the encoders each include a collar 44 supporting a plurality of separate magnets 45 located circumferentially around lead screw 31, together with hall effect switches 46. Other position sensing arrangements can of course be used.

The encoder signals generated by the switches are monitored by encoder microprocessor 36, which performs the tasks of decoding encoder position information for each actuator member, tracking each actuator's position and storing the position information so that it is accessible to master control microprocessor 35.

As shown in FIG. 5, linear actuator members 16 are also provided with integral over-travel and sychronizing switches 47 which are located about actuator members 16 such that they can sense their limits of travel. One such synchronizing switch 47 is located about each actuator member 16 such that master control microprocessor 35 can interpret the generated encoder signals and detect a known starting position for each such actuator member 16.

In some applications, when linear actuator members 16 are being positioned to known locations, the corresponding encoder signals generated by the amount of extension or retraction of actuator members 16 can be interpreted by encoder microprocessor 36 to determine the absolute extension position information for each such actuator member 16.

For the positioning of linear actuator members 16 control system 28 is provided with a positioning program. Through this program an operator is provided with the capability of easily positioning linear actuators 16 to previously programmed locations.

Figure 6A:
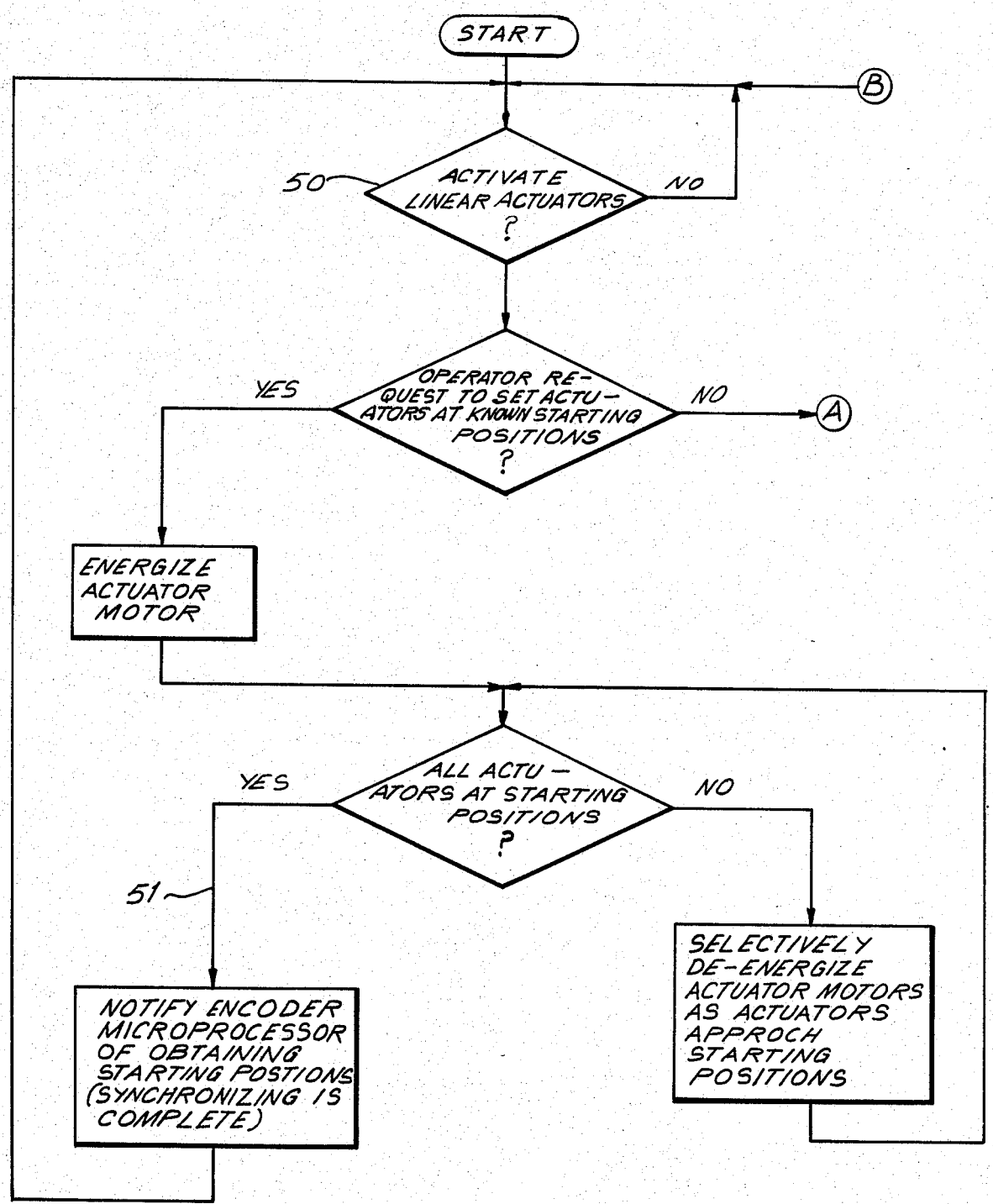
FIG. 6A is a general flow chart of the software routine for positioning the linear actuator members of the present invention.

A flow chart showing the general routine followed by control system 28 in positioning actuator members 16 is disclosed in FIG. 6A. This mode of operation is initiated as indicated at 50 by an operator request entered at control panel 40 to activate each of the linear actuator members 16 within their permissible stroke range. A push button control switch on control panel 40 is associated with the operator request to position all linear actuator members 16 to their known starting positions.

In response to this request, the master control microprocessor 35 commands drive means 41 to start or stop moving actuator members 16 until the corresponding synchronizing switches 47 are activated. The activation of synchronizing switches 47 causes actuator members 16 to be located at their known starting positions. The master control microprocessor 35 then informs encoder microprocessor 36 of the starting positions for actuator members 16 (see 51).

Once actuator members 16 have been positioned at their known locations, then the encoder signals generated by each actuator member 16 can be interpreted by the encoder microprocessor 36 to determine the absolute extension position information for each such member 16. This information is then used by encoder microprocessor 36 to monitor the position of each actuator. At this point the operator can manually jog each actuator member 16 so that each one is positioned to form the desired contour, see 52.

Push button control switches on control panel 40 are associated with particular linear actuator members 16 through master control microprocessor 35, such that an operator, using the appropriate control switch in conjunction with a direction switch, can, via manually controlled jogging, request master control microprocessor 35 to extend or retract a particular actuator member.

Figure 7:
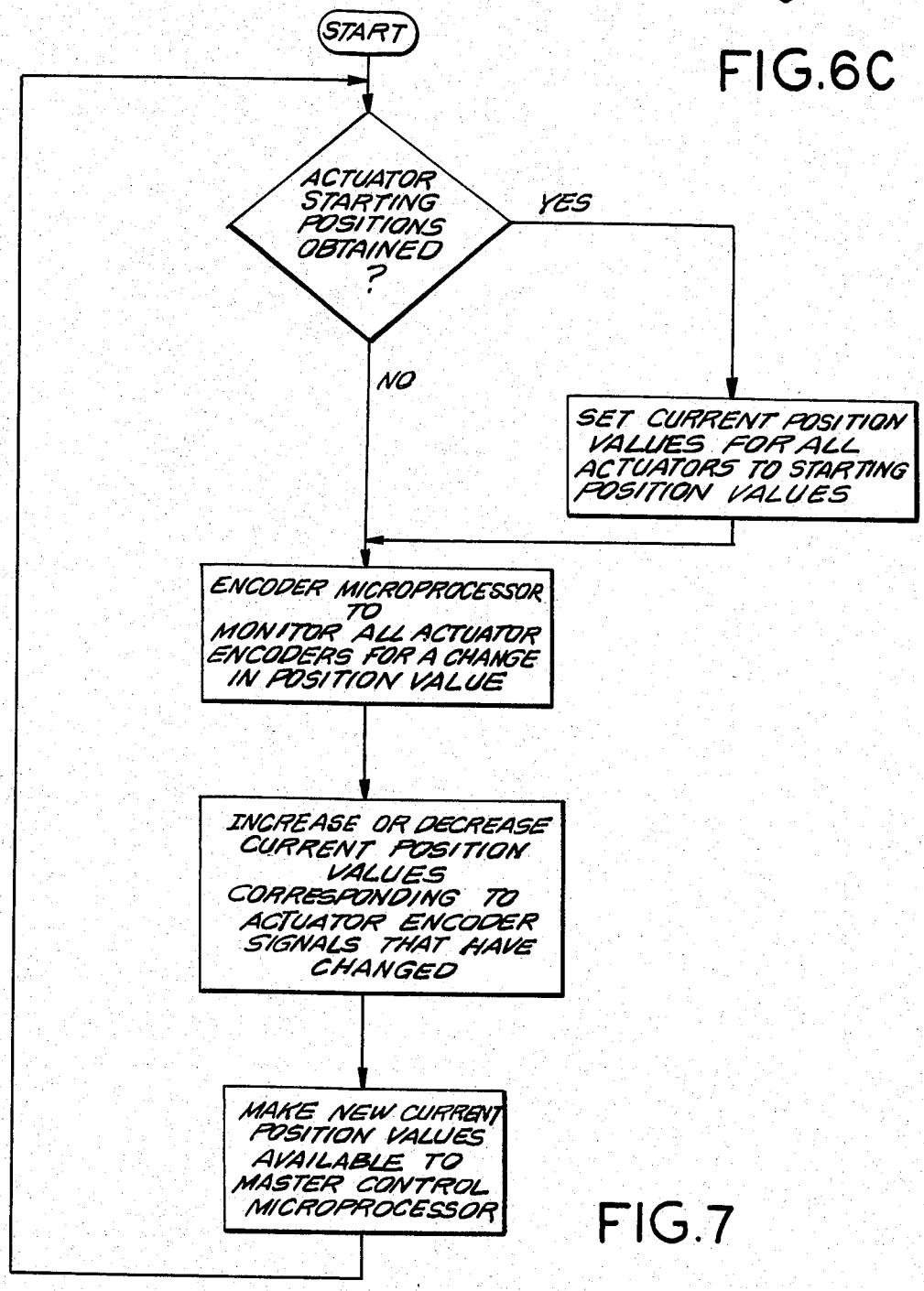
FIG. 7 is a general flow chart of the software routine followed by the encoder microprocessor in monitoring the encoder signals generated for the actuator members.

In response to this request the master control microprocessor 35, which coordinates the execution of this routine, commands drive means 41 to start or stop moving actuator members 16 until the actuators are positioned in their desired locations. During this operation, encoder microprocessor 36 monitors the encoder signals generated for each actuator member 16, and decodes this information to produce current position values for each actuator. A flow chart showing the general routine followed by encoder microprocessor 36 in monitoring the encoder signals generated for actuator members 16 is disclosed in FIG. 7.

Figure 8:
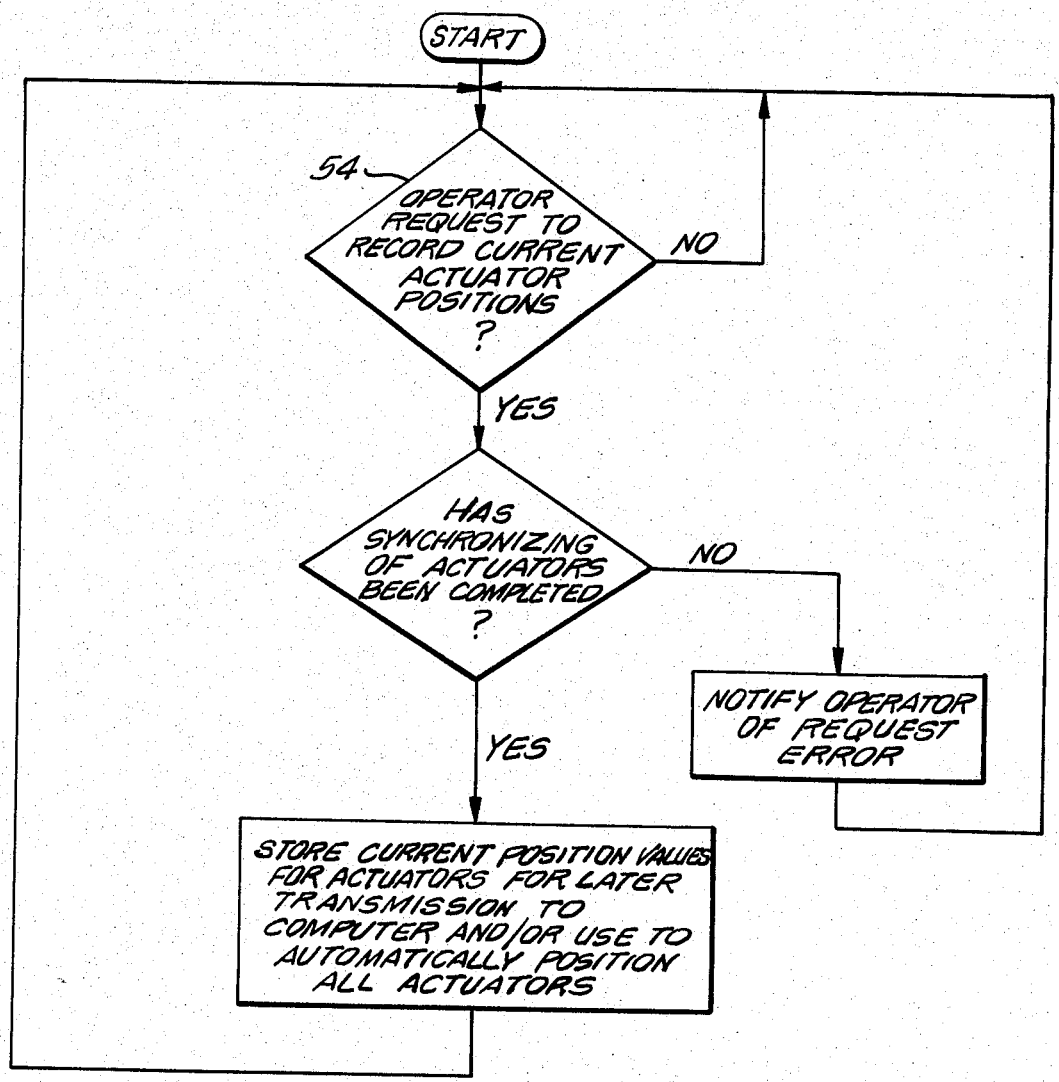
FIG. 8 is a general flow chart of the software routine for recording position values for actuator members.

As is disclosed in FIG. 8, when the operator is satisfied with the contour formed by actuator members 16, he commands the system to record the positions of all the actuators (see 54) by pressing a switch on control panel 40. This causes master control microprocessor 35 to store the current position information generated by encoder microprocessor 36 for each actuator member 16. In response to an operator request, see 55 (FIG. 9), the master control microprocessor 35 can then transmit this position data information to the computer control system 39 via the serial data link 38 for recordation on a disk system, after which master control microprocessor 35 indicates to control panel 40 that the position data information has been recorded and that it is ready to record new position data information for actuator members 16. At this point the operator can manually jog actuator members to other desired positions to be recorded and repeat the recordation request.

Figure 6B:
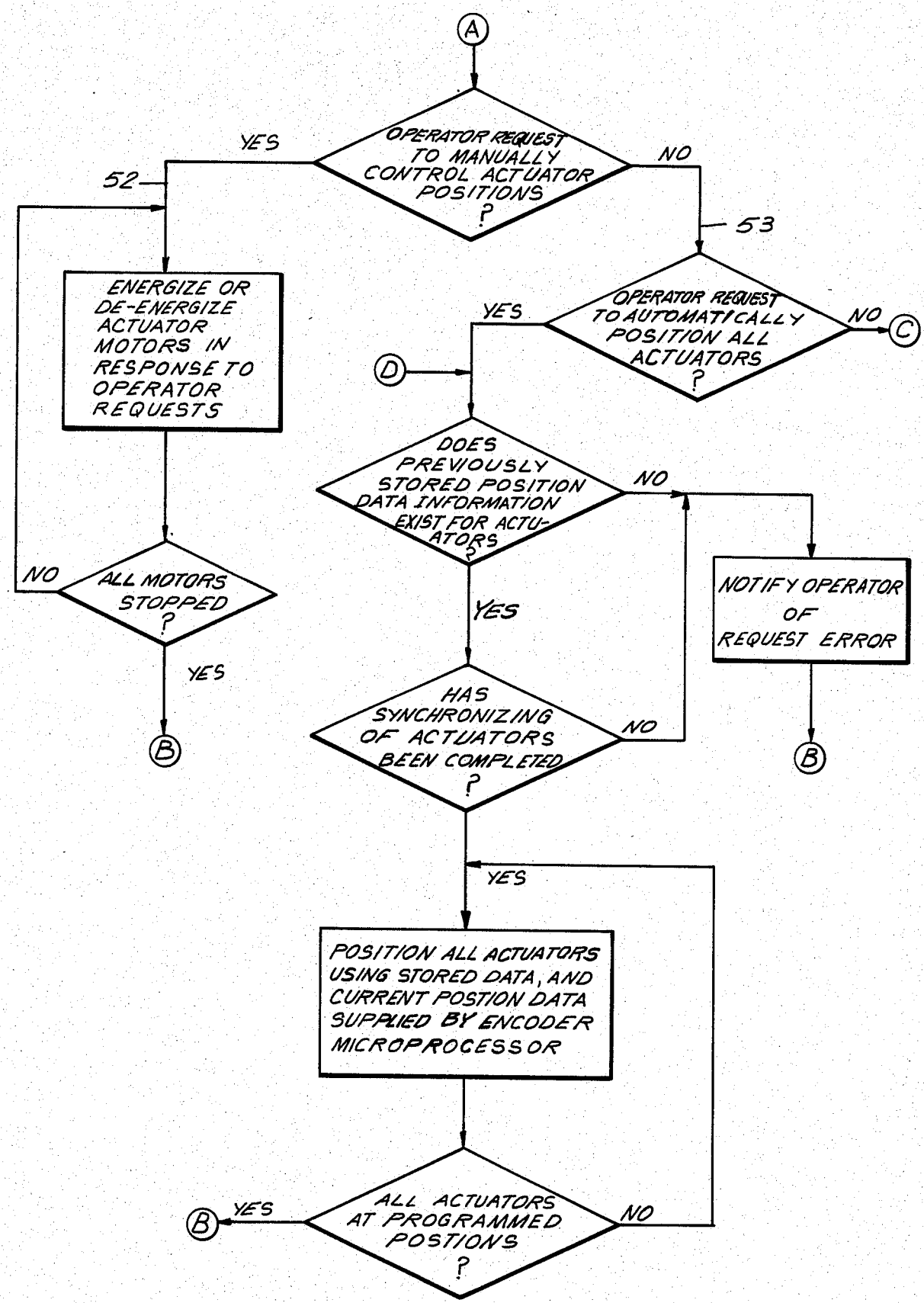
FIG. 6B is a general flow chart of the software routine for automatically positioning linear actuator members to pre-programmed locations.

The general routine followed by control system 28 in automatically positioning linear actuator members 16 to pre-programmed locations is disclosed in FIG. 6B. This mode of operation is initiated as indicated at 53 by an operator request to automatically position actuator members 16. In response to this request, master control microprocessor 35 commands drive means 41 to start moving actuator members 16 in the appropriate direction until the actuators are located at their previously stored positions. During this operation, encoder microprocessor 36 tracks the actuators current position information by interpreting the encoder signals generated by each actuator member 16. The current position information thus generated is then used by master control microprocessor 35 to determine whether each actuator member 16 has been moved to its stored position value. When the master control microprocessor 35 has positioned the last actuator member 16 to its pre-programmed location it indicates to the operator that this operation is complete.

Figure 6C:
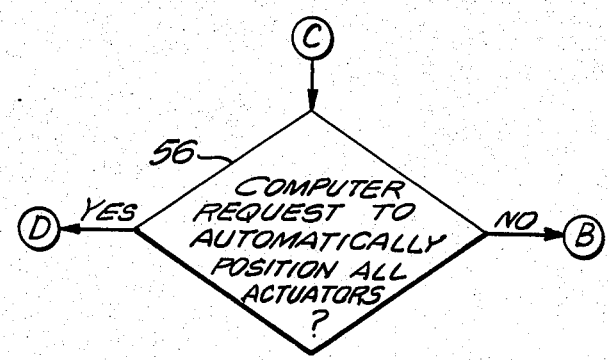
FIG. 6C is a general flow chart of the software routine followed by a suitable computer for automatically positioning linear actuator members to pre-programmed locations.

As is disclosed in FIG. 6C, this same routine may be initiated by a request from computer system 39, via serial data link 38 to master control microprocessor 35 (see 56). In response to this request, master control microprocessor 35 positions actuator members 16 to their pre-programmed locations, resulting in the formation of a pre-determined contoured support plane for a work-piece.

Figure 9:
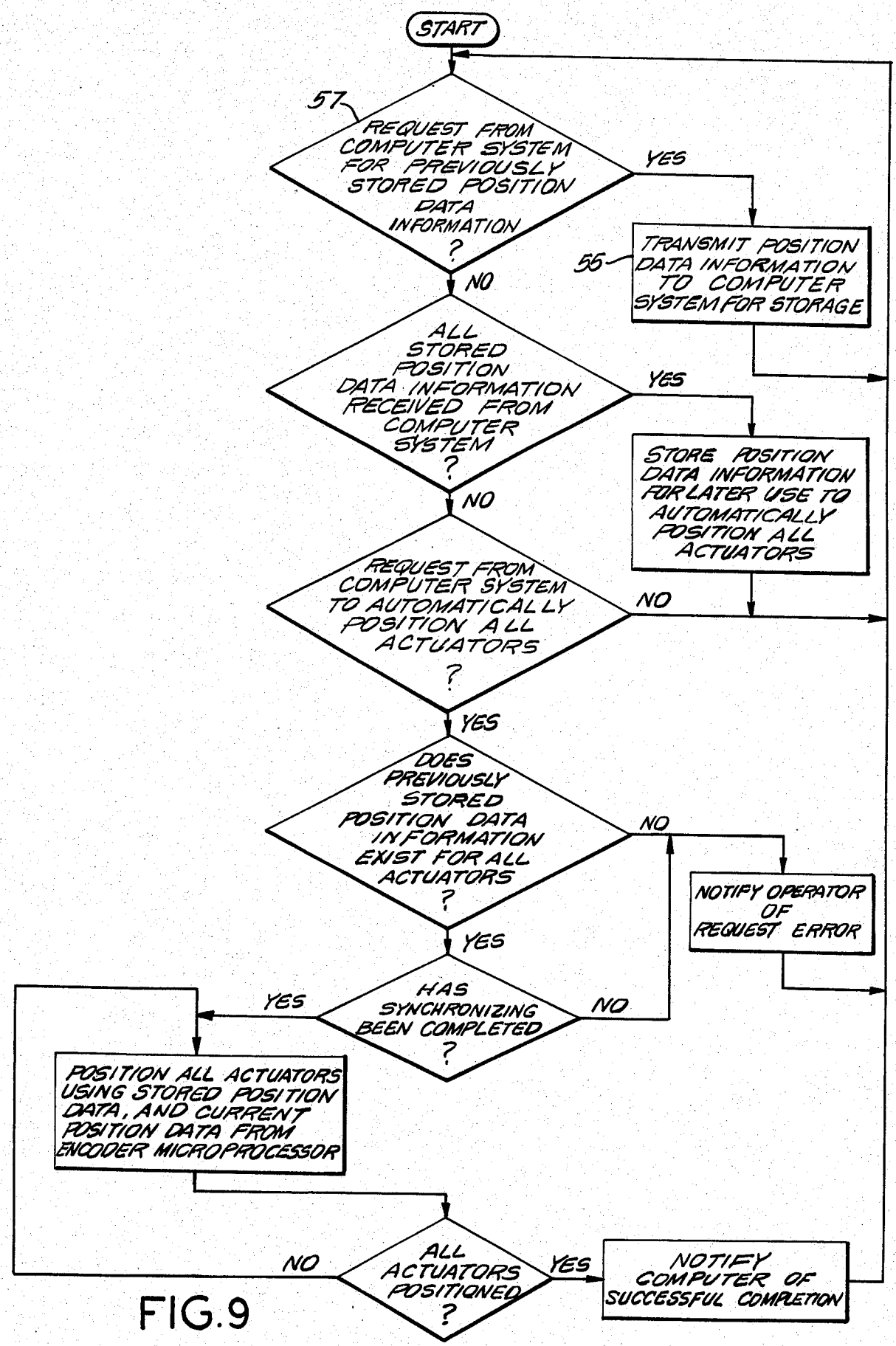
FIG. 9 is a general flow chart of the software routine followed by the control system in communicating with the computer.

A flow chart showing the general routine followed by control system 28 communicating with computer system 39 is disclosed in FIG. 9. This routine is initiated as indicated at 57 by receipt of a command from computer system 39. The command received from computer system 39 may comprise various requests. One such request could be to transmit the previously stored position data information for actuator members 16 to the computer system. In response to this request, master control microprocessor 35 transmits the position data information which has been stored via operator request 54 (see FIG. 8), to the computer system for storage in its data base located on a disk system. Additionally, the computer system may request master control microprocessor 35 to receive the position data information which is stored in its data base and have the master control microprocessor store the information for later use in automatically positioning actuator members 16.

As is also disclosed in FIG. 6C, the computer system could also request master control microprocessor 35 to automatically position all actuators to pre-programmed locations. The routine followed by master control microprocessor in this mode of operation is described above. Using this routine, all of the actuator members 16 are automatically positioned to previously programmed locations under the control of master control microprocessor 35, resulting in the formation of a pre-determined contoured support plane for a work-piece.

Control system 28 is an integral part of support apparatus 10 and is constructed to reside in an enclosure which is fastened to support apparatus 10. Operator console 40 is removable so that in a production environment, all necessary operating instructions, and actuator positioning information is obtained by master control microprocessor 35 via serial data link 38 from the computer control system 39.

The operation of the present invention will now be described. In airplane fabrication, for instance, it is often necessary to perform various manufacturing operations such as trimming, drilling, welding and the like, on the contoured surfaces of work-pieces. In such assembly operations, the exact contour or curvature of such surfaces will be different for various parts and designs. All such curvatures and contours can be determined mathematically and the information for each particular work-piece programmed into the computer. Thus, when a work-piece of pre-determined size and shape is to be subjected to further fabrication, the control system can be activated for that particular work-piece, and the support apparatus 10 of the present invention will be deformed as described to match the contour of the work-piece to be supported. Thus, a single support apparatus as described herein can repeatedly accommodate a wide variety of work-pieces to be fabricated.

Since from the foregoing embodiment the construction and the advantages of the present holding apparatus may be readily understood, further explanation is believed to be unnecessary. However, since numerous modifications will readily occur to those skilled in the art after a consideration of the foregoing specification and accompanying drawings, it is not intended that the invention be limited to the embodiment disclosed herein, but all suitable modifications and equivalents may be resorted to which fall within the scope of the appended claims. Having described the invention,

What is claimed is:

1. An apparatus for holding contoured work-pieces in a pre-determined contour while work is being performed on said work-pieces, said apparatus comprising:
   (i) a base;
   (ii) a spring metal frame attached to said base at one or more points for forming a contoured support plane for said work-pieces, said frame being composed of a plurality of flexible bands, said flexible bands comprising a plurality of flexible supporting bands each interconnected with a plurality of flexible connecting bands;
   (iii) a plurality of linear actuator members positioned at said points on said base and attached to one or more of said flexible connecting bands for deforming said spring metal frame, said actuator members including means for pulling and pushing said flexible bands so as to form concave and convex contours;
   (iv) computer means for activating said linear actuator members for contouring said support plane of said spring metal frame to concave and convex contours; and
   (v) constraining means for holding said contoured work-pieces in said support plane, said constraining means comprising a plurality of spaced vacuum cups mounted on any of said flexible bands.

2. An apparatus as recited in claim 1, which further comprises means for activating said vacuum cups.

3. An apparatus as recited in claim 1, wherein said spring metal frame is a lattice framework of strip spring steel deformable to the pre-determined contour of said work-pieces.

4. An apparatus as recited in claim 1 or 3, wherein said spring metal frame is attached to said base along its horizontal center line.

5. An apparatus as recited in claim 1, wherein said computer means is programmed for forming the predetermined contour by selectively activating an inward-outward movement of said linear actuator members.

6. An apparatus as recited in claim 1, wherein said linear actuator members are positively engaged to said base and said spring metal frame.

7. An apparatus as recited in claim 1, which further includes means for indexing said contoured work-pieces to said contoured support plane of said spring metal frame.

8. An apparatus as recited in claim 7, wherein said indexing means comprises a plurality of index points located on said spring metal frame.

9. An apparatus as recited in claim 8, wherein said indexing means comprises a fixed and an adjustable index point which position said work-pieces in the contoured support plane of said spring metal frame.

10. An apparatus as recited in claim 9, wherein said adjustable index point is manually actuatable.

11. An apparatus as recited in claim 2, wherein said vacuum cups are selectively activated to secure said work-pieces to said spring metal frame.

12. An apparatus as recited in claim 1, which further comprises adjustment means for said vacuum cups.

* * * * *